(12) United States Patent
Yamamoto et al.

(10) Patent No.: US 11,097,620 B2
(45) Date of Patent: Aug. 24, 2021

(54) CIRCUIT SYSTEM FOR RAILROAD VEHICLE

(71) Applicants: Kabushiki Kaisha Toshiba, Minato-ku (JP); TOSHIBA INFRASTRUCTURE SYSTEMS & SOLUTIONS CORPORATION, Kawasaki (JP)

(72) Inventors: Kohei Yamamoto, Saitama (JP); Sakio Nishimiya, Musashino (JP); Sonoko Miyajiri, Tachikawa (JP); Sho Sato, Kunitachi (JP); Hideyuki Shimizu, Hino (JP); Kazuaki Yuuki, Tokorozawa (JP); Tomoyuki Makino, Iruma (JP)

(73) Assignees: Kabushiki Kaisha Toshiba, Minato-ku (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 138 days.

(21) Appl. No.: 16/448,090

(22) Filed: Jun. 21, 2019

(65) Prior Publication Data

US 2019/0299789 A1  Oct. 3, 2019

Related U.S. Application Data

(63) Continuation of application No. PCT/JP2017/046273, filed on Dec. 25, 2017.

(30) Foreign Application Priority Data

Dec. 28, 2016 (JP) .............................. JP2016-254989

(51) Int. Cl.
*B60L 9/24* (2006.01)
*B60L 50/53* (2019.01)
(Continued)

(52) U.S. Cl.
CPC .................. *B60L 9/24* (2013.01); *B60L 1/00* (2013.01); *B60L 3/00* (2013.01); *B60L 50/40* (2019.02);
(Continued)

(58) Field of Classification Search
None
See application file for complete search history.

(56) References Cited

U.S. PATENT DOCUMENTS

| 2012/0000739 A1 | 1/2012 | Nogi et al. |
| 2013/0113279 A1 | 5/2013 | Hatanaka |

(Continued)

FOREIGN PATENT DOCUMENTS

| CN | 102958746 | 3/2013 |
| JP | 05-328611 | 12/1993 |

(Continued)

OTHER PUBLICATIONS

International Search Report dated Apr. 3, 2018 in PCT/JP2017/046273, filed on Dec. 25, 2017 (with English Translation).

(Continued)

*Primary Examiner* — Jared Fureman
*Assistant Examiner* — Aqeel H Bukhari
(74) *Attorney, Agent, or Firm* — Oblon, McClelland, Maier & Neustadt, L.L.P.

(57) ABSTRACT

A circuit system for a railroad vehicle according to an embodiment includes a power conversion unit, a first converter, a second converter, a power storage unit, and a control unit. The power conversion unit converts power supplied from an overhead wire into power for driving a motor for running mounted on a railroad vehicle. The first converter converts power supplied from the overhead wire into DC power. The second converter converts power output from the first converter into power for driving a load mounted on the railroad vehicle. The power storage unit is (Continued)

electrically connected to an input side of the second converter. The control unit inputs regenerative power output from the power conversion unit to the first converter and inputs power output from the first converter to the power storage unit in a case where it is determined that the railroad vehicle is being regenerated.

5 Claims, 5 Drawing Sheets

(51) Int. Cl.
    *B60L 50/40*       (2019.01)
    *B60M 3/00*       (2006.01)
    *B60M 1/12*       (2006.01)
    *H02J 7/00*       (2006.01)
    *B60L 1/00*       (2006.01)
    *B60L 3/00*       (2019.01)
    *H01M 10/48*       (2006.01)
    *H02J 7/34*       (2006.01)

(52) U.S. Cl.
    CPC ............... *B60L 50/53* (2019.02); *B60M 1/12* (2013.01); *B60M 3/00* (2013.01); *H01M 10/48* (2013.01); *H02J 7/00* (2013.01); *H02J 7/345* (2013.01); *H02J 2207/20* (2020.01); *Y02T 10/70* (2013.01); *Y02T 10/72* (2013.01)

(56) References Cited

U.S. PATENT DOCUMENTS

| | | | |
|---|---|---|---|
| 2013/0229052 A1* | 9/2013 | Kitanaka | ............... B60L 3/0046 307/9.1 |
| 2015/0115703 A1* | 4/2015 | Hatanaka | ................ B60L 9/22 307/9.1 |
| 2015/0202978 A1* | 7/2015 | Hatanaka | ................ B60L 7/26 701/19 |
| 2015/0343906 A1* | 12/2015 | Hatanaka | ............... B60L 3/0069 307/9.1 |
| 2016/0185224 A1 | 6/2016 | Kuttenkuler et al. | |

FOREIGN PATENT DOCUMENTS

| | | |
|---|---|---|
| JP | 2011-004566 | 1/2011 |
| JP | 2012-85535 | 4/2012 |
| JP | 2012-125128 | 6/2012 |
| JP | 2014-166104 | 9/2014 |
| JP | 2016-136832 | 7/2016 |
| WO | WO 2010/103859 A1 | 9/2010 |

OTHER PUBLICATIONS

Extended European Search Report dated Jul. 6, 2020 in European Patent Application No. 17888149.6, 10 pages.

* cited by examiner

CIRCUIT SYSTEM FOR RAILROAD VEHICLE

TECHNICAL FIELD

Embodiments of the present invention relate to a circuit system for a railroad vehicle.

BACKGROUND ART

In recent years, there has become known a railroad vehicle that accumulates regenerative energy generated at the time of deceleration of the railroad vehicle in an electrical storage device, drives a motor for running using the power supplied from the electrical storage device, and runs by rotating wheels using a driving force of the motor for running. In addition, such a railroad vehicle can run by driving the motor for running using power supplied from an overhead wire. Here, since the energy used for the railroad vehicle is limited, it is preferable that the railroad vehicle be effectively utilized by improving the efficiency of use of energy used in the railroad vehicle.

CITATION LIST

Patent Literature

[Patent Literature 1]
Japanese Unexamined Patent Application, First Publication No. 2012-125128

SUMMARY OF INVENTION

Technical Problem

An object of the present invention is to provide a circuit system for a railroad vehicle capable of achieving effective utilization of power used in the railroad vehicle.

Solution to Problem

According to the present invention, a circuit system for a railroad vehicle according to an embodiment includes a power conversion unit, a first converter, a second converter, a power storage unit, and a control unit. The power conversion unit converts power supplied from an overhead wire into power for driving a motor for running mounted on a railroad vehicle. The first converter converts power supplied from the overhead wire into DC power. The second converter converts power output from the first converter into power for driving a load mounted on the railroad vehicle. The power storage unit is connected to an input side of the second converter. The control unit inputs regenerative power output from the power conversion unit to the first converter and inputs power output from the first converter to the power storage unit in a case where it is determined that the railroad vehicle is being regenerated.

DESCRIPTION OF EMBODIMENTS

Hereinafter, a circuit system for a railroad vehicle according to an embodiment will be described with reference to the accompanying drawings.

First Embodiment

First, a first embodiment will be described.

Figure 1:
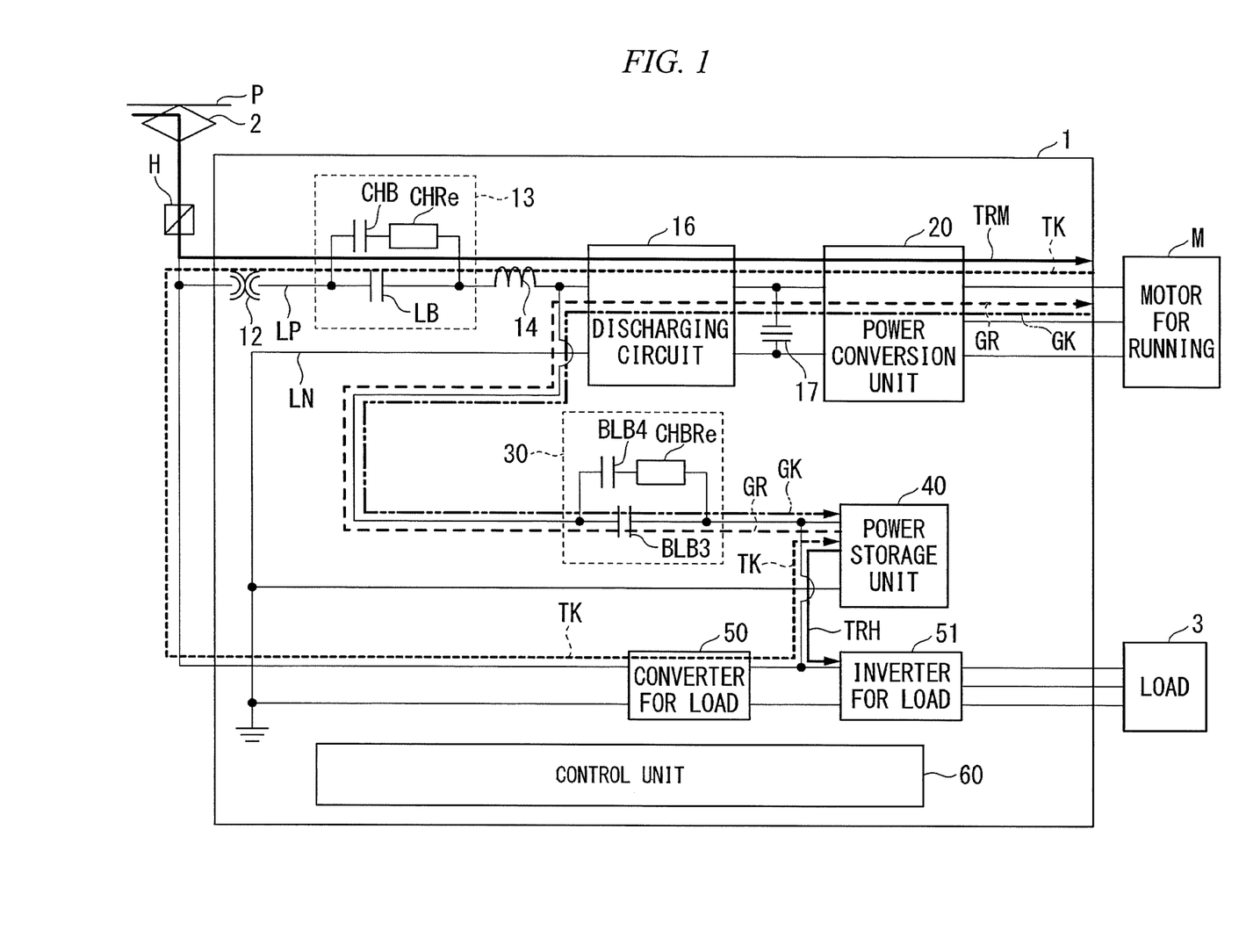
FIG. 1 is a configuration diagram showing a circuit system for a railroad vehicle according to a first embodiment.

FIG. 1 is a configuration diagram showing a state where a railroad vehicle using a circuit system 1 for a railroad vehicle according to the first embodiment is in contact with an overhead wire P. The circuit system 1 for a railroad vehicle (hereinafter, referred to as the circuit system 1) includes a breaker 12, a charging circuit 13, a filter reactor 14, a discharging circuit 16, a filter capacitor 17, a power conversion unit 20, a charging circuit 30, a power storage unit 40, a converter (first converter) 50 for a load, an inverter (second converter) 51 for a load, and a control unit 60.

The railroad vehicle having the circuit system 1 mounted thereon receives power supplied from the overhead wire P coming into contact with a current collector 2 to drive a motor for running M and runs on a track not shown in the drawing. Further, in a case where power is not supplied from the overhead wire P, the motor for running M is driven by receiving power supplied from the power storage unit 40 of the circuit system 1. In this manner, a railroad vehicle running by switching depending on a situation so as to use at least one of power supplied from the overhead wire P and power supplied from the power storage unit 40 may also be referred to as a hybrid railroad vehicle.

In addition, the railroad vehicle having the circuit system 1 mounted thereon receives power supplied from the overhead wire P or the power storage unit 40 to drive a load 3. The load 3 is an auxiliary machine (for example, lighting equipment or heating and cooling equipment) mounted on a vehicle. Power supplied to the inverter 51 for a load driving the load 3 has a voltage lower than a voltage of power supplied to the power conversion unit 20 driving the motor for running M.

The circuit system 1 of the present application has a "normal mode" for running the railroad vehicle using power supplied from the overhead wire P and a "self-running mode (hereinafter, referred to as a self-running mode)" for running the railroad vehicle using power supplied from the power storage unit 40. Here, whether the railroad vehicle is in a "normal mode" or a "self-running mode" is indicated by a control signal transmitted from a controller not shown in the drawing.

In a case where the railroad vehicle is run in a normal mode, power supplied from the overhead wire P is used as power for driving the motor for running M, and power having a voltage value (for example, approximately 1500 [V], and hereinafter referred to as a "high voltage") which is higher than a voltage value of power supplied to the inverter 51 for a load driving the load 3 is supplied to the power conversion unit 20 driving the motor for running M.

In a case where the railroad vehicle is run in a self-running mode, power supplied from the power storage unit 40 is used as power for driving the motor for running M, and power having a voltage value (for example, approximately 750 [V], and hereinafter referred to as a "low voltage") which is lower than a voltage value in the normal mode is supplied to the power conversion unit 20.

In addition, the circuit system 1 has a regeneration function of regenerating power generated by the motor for running M, and the motor for running M is driven using high voltage power at the time of regeneration in a normal mode, whereby high voltage regenerative power is generated. Here, the wording "at the time of regeneration" indicates a case where power generation is performed using motive power input from axles of running wheels not shown in the drawing at the time of braking or acceleration of the railroad vehicle. In addition, whether the railroad vehicle is being "regenerated" is indicated by a control signal transmitted from a controller not shown in the drawing.

The motor for running M is driven using low voltage power at the time of regeneration in a self-running mode, whereby low voltage regenerative power is generated.

A fuse H is connected in series between the overhead wire P and the circuit system 1. The fuse H is a protection circuit that protects the circuit system 1. For example, in a case where a current of power supplied from the overhead wire P is a large current, a cutoff state where electrical connection between the overhead wire P and the circuit system 1 is cut off is set due to fusing inside the fuse H or the like in the circuit system 1.

The breaker 12 is electrically connected in series between the fuse H and the charging circuit 13. The breaker 12 sets an electrical connection state or a cutoff state between the fuse H and the charging circuit 13. The breaker 12 is, for example, a high-speed breaker (HB).

The charging circuit 13 is a circuit, connected between the breaker 12 and the filter reactor 14, which charges a filter capacitor 17 to be described later with high voltage or low voltage power. The charging circuit 13 includes, for example, a contactor LB electrically connected to a positive electrode wire LP, a contactor CHB electrically connected to the contactor LB in parallel, and a resistor CHRe.

The charging circuit 13 sets an electrical connection state or a cutoff state between the contactors LB and CHB under the control of the control unit 60. In a case where charging of the filter capacitor 17 is started, first, the charging circuit 13 switches the contactor CHB to an electrical connection state. Thereafter, the charging circuit 13 switches the contactor LB to an electrical connection state and switches the contactor CHB from an electrical connection state to a cutoff state.

The filter capacitor 17 is charged by the contactor CHB being switched to an electrical connection state. In addition, the charging circuit 13 switches the contactor LB to an electrical connection state after the filter capacitor 17 is charged.

The filter reactor 14 is connected between the charging circuit 13 and the discharging circuit 16 and removes a high frequency component included in power input to the filter reactor 14. For example, the filter reactor 14 removes a high frequency component included in power supplied from the overhead wire P and a high frequency component due to a control signal or the like included in power returned to the overhead wire P.

The discharging circuit 16 is a circuit that discharges the filter capacitor 17 connected between the positive electrode wire LP and the negative electrode wire LN between the filter reactor 14 and the filter capacitor 17.

The discharging circuit 16 includes a discharging switch electrically connected to the filter capacitor 17 in parallel and a resistor connected to the discharging switch in series. The discharging circuit 16 sets the discharging switch to be in an electrical connection state or a cutoff state under the control of the control unit 60. In a case where discharging of the filter capacitor 17 is started, the discharging circuit 16 sets the discharging switch to be in an electrical connection state. Thereafter, when discharging of the filter capacitor 17 is terminated, the discharging circuit 16 sets the discharging switch to be in a cutoff state.

The filter capacitor 17 smoothes power supplied to the power conversion unit 20.

The power conversion unit 20 converts DC power supplied from the overhead wire P into AC power for driving the motor for running M mounted on the railroad vehicle. The power conversion unit 20 includes, for example, a switching element and switches the switching element to an electrical connection state or a cutoff state on the basis of a control signal received from the control unit 60 to convert DC power into AC power.

The charging circuit 30 has the same configuration as the charging circuit 13, and thus description thereof will be omitted. However, the charging circuit 13 is different from the charging circuit 30 in that the charging circuit 13 charges the filter capacitor 17 using high voltage power supplied from the overhead wire P, whereas the charging circuit 30 charges the filter capacitor 17 using low voltage power supplied from the power storage unit 40.

In the power storage unit 40, a first terminal is connected to an input side of the inverter 51 for a load. The power storage unit 40 supplies power stored in the power storage unit 40 to the inverter 51 for a load on the basis of a control signal received from the control unit 60.

Further, in the power storage unit 40, a second terminal is connected to an input side of the discharging circuit 16. The power storage unit 40 supplies power stored in the power storage unit 40 to the power conversion unit 20 on the basis of a control signal received from the control unit 60.

The power storage unit 40 stores regenerative power supplied from the power conversion unit 20 at the time of regeneration on the basis of a control signal received from the control unit 60.

Here, a voltage range of power stored in the power storage unit 40 is a low voltage. For this reason, in a case where regenerative power supplied from the power conversion unit 20 has a high voltage, the power of the high voltage regenerative needs to be converted into low voltage regenerative power and then stored in the power storage unit 40.

In the circuit system 1 of the present embodiment, high voltage regenerative power is converted into low voltage regenerative power using a converter 50 for a load to be described later.

The converter 50 for a load converts input DC power into DC power having a desired current and voltage and outputs the converted DC power. The converter 50 for a load includes, for example, a switching element. The converter 50 for a load switches the switching element to an electrical connection state or a cutoff state on the basis of a control signal received from the control unit 60 to convert DC power supplied from the overhead wire P into DC power having a desired current and voltage.

The inverter 51 for a load converts power output from the converter 50 for a load into AC power for driving the load 3.

The control unit 60 is a software functional unit which is realized by a processor such as a central processing unit (CPU) executing a program stored in a program memory. In addition, some or all of these functional units may be realized by hardware such as a large scale integration (LSI), an application specific integrated circuit (ASIC), or a field-programmable gate array (FPGA).

The control unit 60 controls the charging circuit 13, the discharging circuit 16, the power conversion unit 20, the charging circuit 30, the power storage unit 40, the converter 50 for a load, and the inverter 51 for a load.

In addition, the control unit 60 receives a control signal transmitted from a controller provided in a steering wheel, not shown in the drawing, or the like of the railroad vehicle. The control signal transmitted from the controller includes information indicating whether a normal mode is set. In addition, the control signal transmitted from the controller includes information indicating whether power running is set. The control unit 60 determines whether a normal mode is set on the basis of a control signal received from the controller. In addition, the control unit 60 determines whether power running is set on the basis of a control signal received from the controller.

The control unit 60 inputs power supplied from the overhead wire P to the power conversion unit 20 through the overhead wire P, the fuse H, the breaker 12, the charging circuit 13, the filter reactor 14, and the discharging circuit 16 as indicated by sign TRM at the time of power running in a normal mode. Since power supplied from the overhead wire P is high voltage power, the motor for running M is driven with a high voltage at the time of power running in a normal mode.

In addition, the control unit 60 inputs power supplied from the power storage unit 40 to the inverter 51 for a load from the power storage unit 40 as indicated by sign TRH at the time of power running in a normal mode.

The control unit 60 inputs regenerative power which is generated by the motor for running M and output from the power conversion unit 20 to the power storage unit 40 through the discharging circuit 16, the charging circuit 13, the breaker 12, and the converter 50 for a load as indicated by sign TK at the time of regeneration in a normal mode. High voltage regenerative power output from the power conversion unit 20 is converted into low voltage regenerative power by being input to the converter 50 for a load and is output. That is, the high voltage regenerative power is stepped down by using the converter 50 for a load. Thereby, low voltage regenerative power is stored in the power storage unit 40 by utilizing high voltage power.

The control unit 60 inputs power supplied from the power storage unit 40 to the power conversion unit 20 through the charging circuit 30 and the discharging circuit 16 as indicated by sign GR at the time of power running in a self-running mode. Since power supplied from the power storage unit 40 is low voltage power, the motor for running M is driven with a low voltage at the time of power running in a self-running mode.

In addition, the control unit 60 inputs power supplied from the power storage unit 40 from the power storage unit 40 to the inverter 51 for a load as indicated by sign TRH in a self-running mode.

The control unit 60 inputs low voltage regenerative power generated by the motor for running M and output from the power conversion unit 20 to the power storage unit 40 through the discharging circuit 16 and the charging circuit 30 as indicated by sign GK at the time of regeneration in a self-running mode. Since the regenerative power is also low voltage power due to the motor for running M being driven with low voltage power, the low voltage regenerative power output from the power conversion unit 20 does not need to be converted into low voltage regenerative power for power storage and can be stored in the power storage unit 40 as it is.

In a case where the supply of power from the overhead wire P is started, the control unit 60 charges the filter capacitor 17 with power supplied from the overhead wire P. In this case, the control unit 60 charges the filter capacitor 17 using the charging circuit 13.

Further, in a case where the supply of power from the power storage unit 40 is started, the control unit 60 discharges the filter capacitor 17 charged with power supplied from the overhead wire P. In addition, the control unit 60 charges the filter capacitor 17 with power supplied from the power storage unit 40. In this case, the control unit 60 discharges the filter capacitor 17 using the discharging circuit 16. In addition, the control unit 60 charges the filter capacitor 17 using the charging circuit 30.

Figure 2:
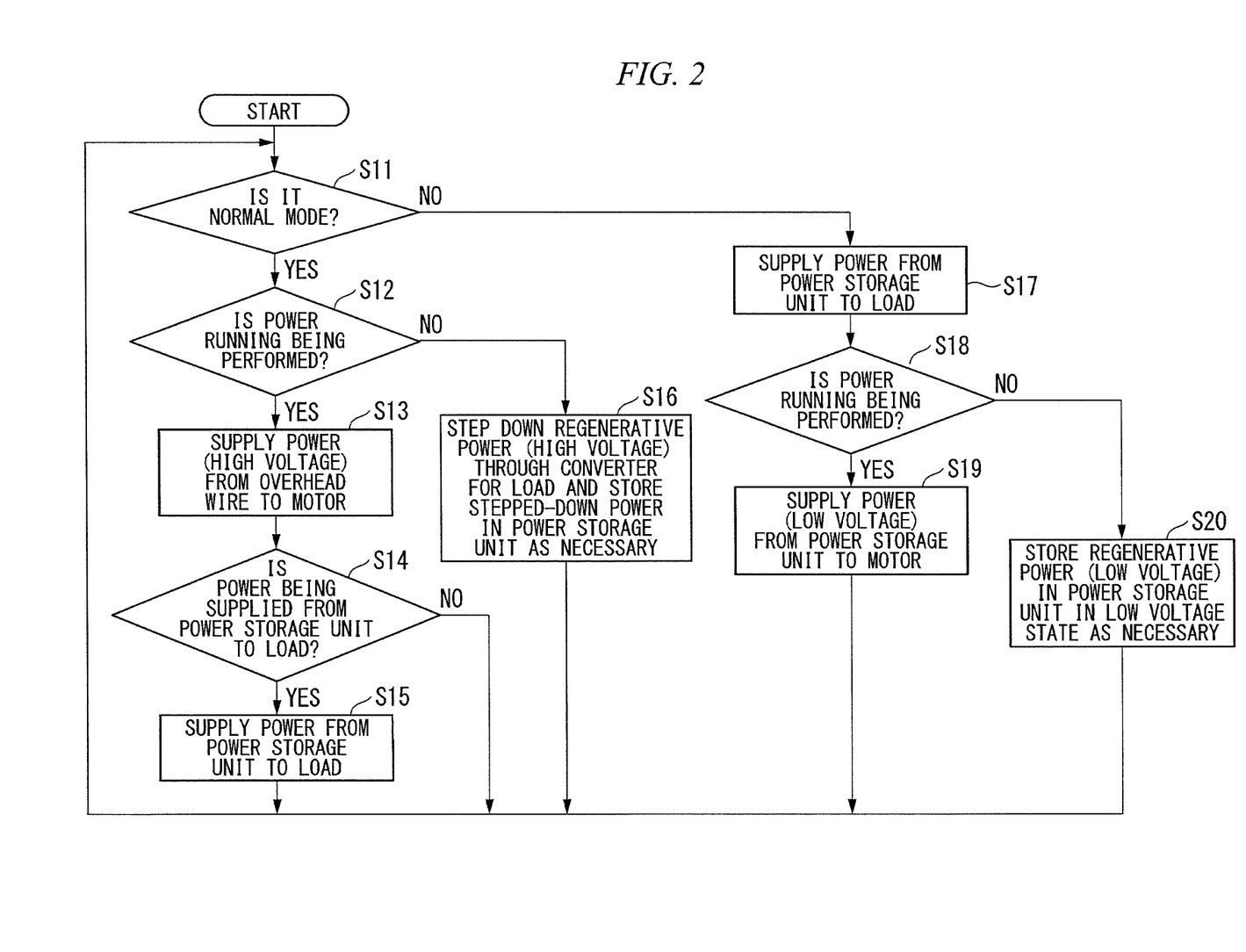
FIG. 2 is a flowchart showing operations of the circuit system for a railroad vehicle according to the first embodiment.

Here, operations of the circuit system 1 will be described using FIG. 2. FIG. 2 is a flowchart showing operations of the circuit system 1.

The control unit 60 determines whether a normal mode is set on the basis of a control signal transmitted from the controller (step S11) Subsequently, the control unit 60 determines whether power running is set on the basis of a control signal transmitted from the controller (step S12).

The control unit 60 outputs DC power supplied from the overhead wire P to the power conversion unit 20 at the time of power running in a normal mode. The power conversion unit 20 converts the DC power supplied from the overhead wire P into AC power and supplies the AC power to the motor for running M (step S13). In this case, power supplied to the motor for running M is high voltage power.

In addition, the control unit 60 determines whether or not power supplied from the power storage unit 40 is output to the load 3 on the basis of information such as the amount of power stored in the power storage unit 40 (step S14). For example, the control unit 60 determines that power is output to the load 3 in a case where the amount of power stored is equal to or greater than a predetermined reference value, and the control unit 60 determines that power is not output to the load 3 in a case where the amount of power stored is less than the predetermined reference value. In a case where the control unit 60 determines that power supplied from the power storage unit 40 is output to the load 3, the control unit outputs power supplied from the power storage unit 40 to the load 3 (step S15).

In a case where power running in a normal mode is not performed and regenerable power is obtained (for example, in a case where a regenerative brake is operating), the control unit 60 generates regenerative power in the power conversion unit 20. In this case, the regenerative power generated in the power conversion unit 20 is high voltage power. The control unit 60 inputs the high voltage regenerative power generated by the power conversion unit 20 to the converter 50 for a load. The converter 50 for a load converts the high voltage regenerative power into low voltage regenerative power to step down the voltage and outputs the regenerative power having a stepped-down voltage. Thereby, low voltage regenerative power is stored in the power storage unit 40 (step S16).

In a case where a normal mode is not set (that is, in a case where a self-running mode is set), the control unit 60 outputs power supplied from the power storage unit 40 to the load 3 (step S17). Further, in a case where a self-running mode is set and power running is performed (step S18), the control unit 60 causes the power conversion unit 20 to convert power supplied from the power storage unit 40 into AC power and supplies the converted power to the motor for running M (step S19). In this case, the power supplied to the motor for running M is low voltage power.

In a case where power running in a self-running mode is not performed and regenerable power is obtained (for example, in a case where a regenerative brake is operating), the control unit 60 generates regenerative power in the power conversion unit 20. In this case, regenerative power generated in the power conversion unit 20 is low voltage power. The control unit 60 inputs low voltage regenerative power generated by the power conversion unit 20 to the power storage unit 40. Thereby, low voltage regenerative power output from the power conversion unit 20 is stored in the power storage unit 40 (step S20).

According to the above-described first embodiment, the circuit system 1 inputs high voltage regenerative power output from the power conversion unit 20 to the converter 50 for a load and inputs power output from the converter 50 for a load to the power storage unit 40. Thereby, according to the circuit system 1, high voltage regenerative power is stepped down by using the converter 50 for a load, and thus it is possible to store low voltage regenerative power in the power storage unit 40 and to achieve effective utilization of power used in the railroad vehicle. In addition, a voltage of power stored in the power storage unit 40 is stepped down by using the converter 50 for a load, and thus it is possible to save space without requiring use of a dedicated adjustment circuit (for example, a chopper circuit) which adjusts power to be stored in the power storage unit 40.

In addition, the control unit 60 inputs power output from the power storage unit 40 to the inverter 51 for a load and converts the power into AC power for driving the load 3. Thereby, according to the circuit system 1, it is also possible to drive the load 3 with power output from the power storage unit 40 at the time of power running in a normal mode, to reduce the use of power supplied from the overhead wire P, and to achieve effective utilization of power used in the railroad vehicle.

In addition, the control unit 60 supplies power output from the power storage unit 40 to the power conversion unit 20 in a self-running mode. Thereby, according to the circuit system 1, also in a system in which high voltage power is stepped down by using the converter 50 for a load and stored in the power storage unit 40, it is possible to drive the motor for running M using power output from the power storage unit 40 and to achieve effective utilization of power used in the railroad vehicle.

In addition, the control unit 60 inputs regenerative power output from the power conversion unit 20 to the power storage unit 40 at the time of regeneration in a self-running mode. Thereby, according to the circuit system 1, also in a system in which high voltage power is stepped down by using the converter 50 for a load and stored in the power storage unit 40, it is possible to store regenerative power at the time of regeneration in a self-running mode in the power storage unit 40 and to achieve effective utilization of power used in the railroad vehicle.

Further, in a case where a normal mode is switched to a self-running mode, the control unit 60 controls the charging circuit 30 such that the filter capacitor 17 is charged with power output from the power storage unit 40. Thereby, according to the circuit system 1, also in a system in which high voltage power is stepped down by using the converter 50 for a load and stored in the power storage unit 40, it is possible to supply power smoothed by the filter capacitor 17 in a self-running mode to the power conversion unit 20 and to achieve effective utilization of power used in the railroad vehicle.

Second Embodiment

Figure 3:
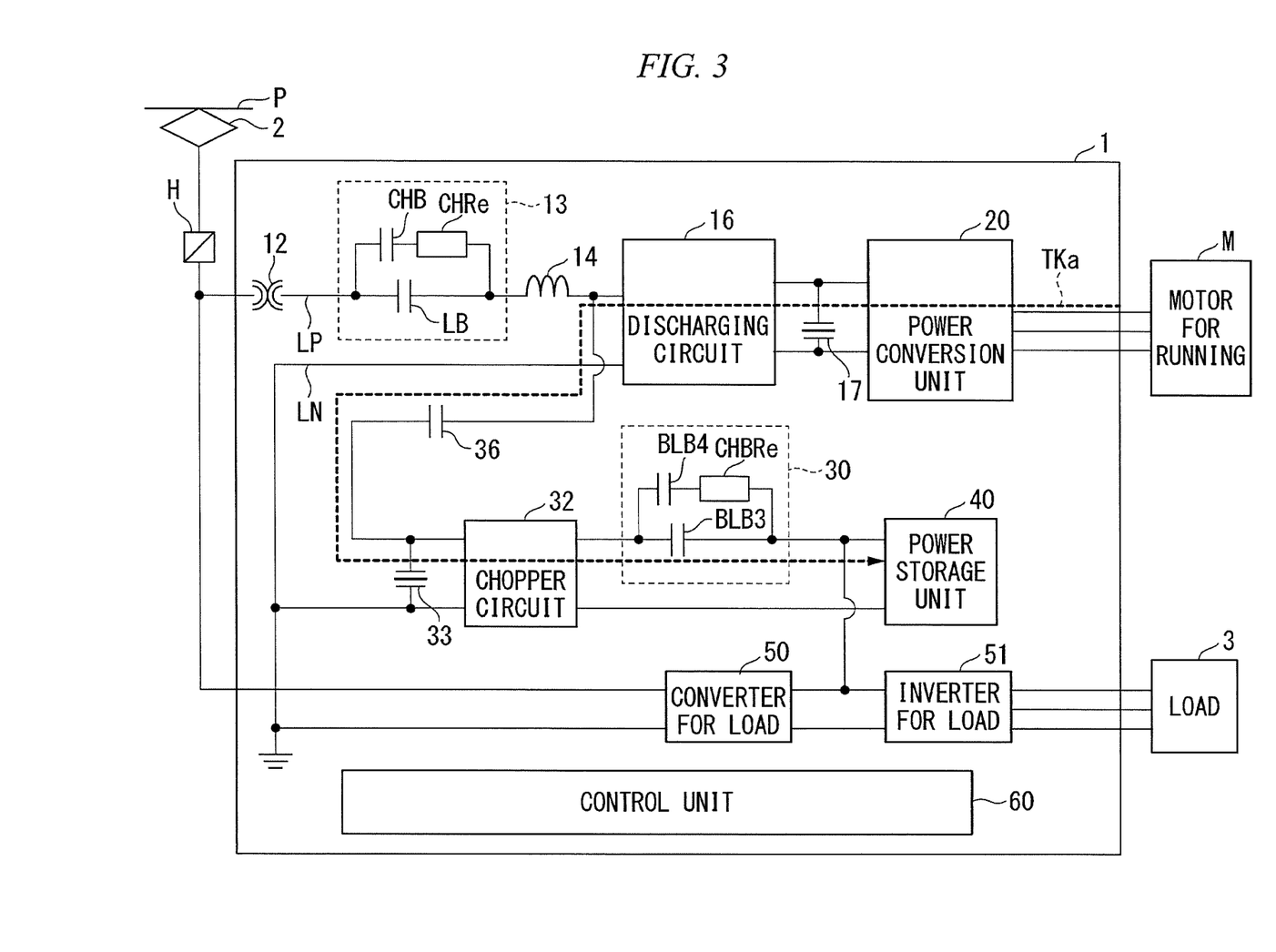
FIG. 3 is a configuration diagram showing a circuit system for a railroad vehicle according to a second embodiment.

Next, a second embodiment will be described. FIG. 3 is a diagram illustrating the second embodiment. Components the same as the above-described components are denoted by the same reference numerals and signs, and description thereof will be omitted.

As shown in FIG. 3, a circuit system 1 according to the second embodiment further includes a chopper circuit 32, a contactor 36, and a filter capacitor 33 in addition to the circuit system 1 according to the first embodiment.

The chopper circuit 32 is connected between a power conversion unit 20 and a power storage unit 40. The chopper circuit 32 adjusts a voltage of power output from the power storage unit 40. The chopper circuit 32 steps down regenerative power output from the power conversion unit 20 from a high voltage to a low voltage and outputs the stepped-down power to the power storage unit 40 at the time of regeneration. In addition, the chopper circuit 32 steps up power output from the power storage unit 40 from a low voltage to a high voltage and supplies the stepped-up power to the power conversion unit 20 at the time of power running.

The chopper circuit 32 includes, for example, a switching element, a reactor, a rectifier, a capacitor, and the like. The chopper circuit 32 controls the turn-on and turn-off of the switching element of the chopper circuit 32 on the basis of, for example, a control signal (for example, a pulse width modulation (PWM) control signal) which is output from the control unit 60. Thereby, the chopper circuit 32 steps down regenerative power output from the power conversion unit 20 and steps up power output from the power storage unit 40.

The filter capacitor 33 is electrically connected to the chopper circuit 32 in parallel between the chopper circuit 32 and the discharging circuit 16. The filter capacitor 33 smoothes power which is input to or output from the chopper circuit 32.

The contactor 36 sets a cutoff state or a connected state between the chopper circuit 32 and the power conversion unit 20 under the control of the control unit 60.

The control unit 60 controls the chopper circuit 32 and the contactor 36. The control unit 60 inputs regenerative power output from the power conversion unit 20 to the power storage unit 40 through the discharging circuit 16, the chopper circuit 32, and the charging circuit 30 as indicated by sign TKa at the time of regeneration in a normal mode. High voltage regenerative power output from the power conversion unit 20 is stepped down by being input to the chopper circuit 32 and is output as low voltage regenerative power. Thereby, the low voltage regenerative power is stored in the power storage unit 40.

In addition, the control unit 60 inputs power output from the power storage unit 40 to the chopper circuit 32 at the time of power running. Low voltage power output from the power storage unit 40 is stepped up by being input to the chopper circuit 32 and is output as high voltage power. High voltage power output from the chopper circuit 32 is supplied to the power conversion unit 20.

The control unit 60 sets the contactor 36 to be in a cutoff state in order to protect the circuit system 1, for example, in a case where an abnormal current is applied between the chopper circuit 32 and the power conversion unit 20. Thereby, the control unit 60 prevents a defect from occurring in the circuit system 1 due to the application of an abnormal current in the circuit system 1. In addition, the control unit 60 sets the contactor 36 to be in a cutoff state in a case where a normal mode is switched to a self-running mode in a circuit system 1 according to a third embodiment to be described later. In the circuit system 1 according to the second embodiment, the contactor 36 is set to be in a connected state in a normal case, except for an abnormal case such as a case where the above-described abnormal current is applied.

According to the above-described second embodiment, the circuit system 1 steps down regenerative power output from the power conversion unit 20 by the chopper circuit 32 and outputs the stepped-down power to the power storage unit 40 at the time of regeneration in a normal mode. Thereby, according to the circuit system 1, also in a system in which high voltage power is stepped down by using a converter 50 for a load and stored in the power storage unit 40, it is possible to step down regenerative power by using the chopper circuit 32, to store the stepped-down power in the power storage unit 40, and to achieve effective utilization of power used in the railroad vehicle.

In addition, the circuit system 1 steps up regenerative power output from the power storage unit 40 by the chopper circuit 32 and outputs the stepped-up power to the power conversion unit 20 at the time of power running. Thereby, according to the circuit system 1, also in a system in which high voltage power is stepped down by using the converter 50 for a load and stored in the power storage unit 40, it is possible to step up power output from the power storage unit 40 by using the chopper circuit 32, to supply the stepped-up power to the power conversion unit 20, and to achieve effective utilization of power used in the railroad vehicle.

Third Embodiment

Figure 4:
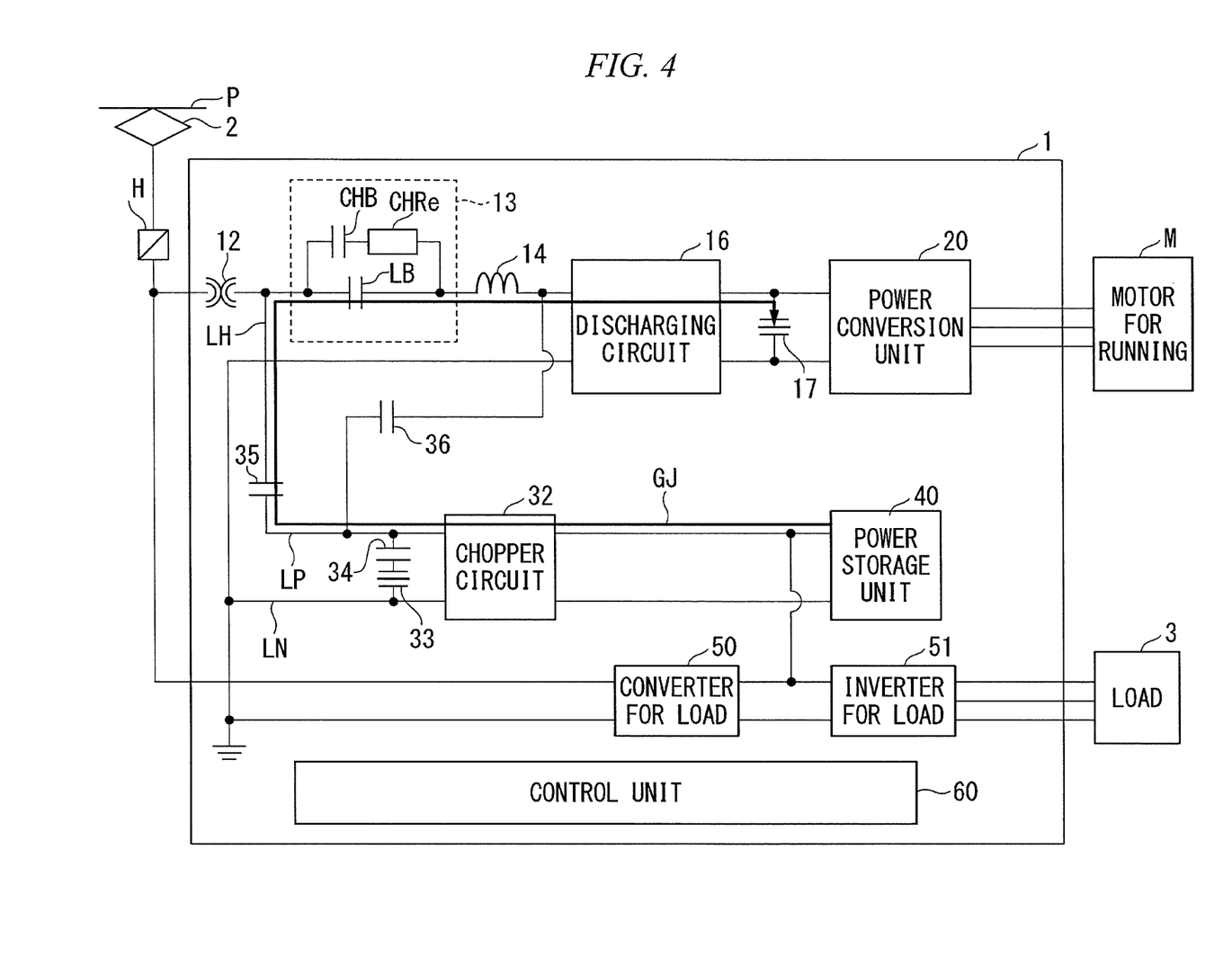
FIG. 4 is a configuration diagram showing a circuit system for a railroad vehicle according to a third embodiment.

Next, a third embodiment will be described. FIG. 4 is a diagram illustrating the third embodiment. Components the same as the above-described components are denoted by the same reference numerals and signs, and description thereof will be omitted.

As shown in FIG. 4, a circuit system 1 according to the third embodiment does not include the charging circuit 30 of the circuit system 1 in the first embodiment. Further, in the circuit system 1 in the third embodiment, the chopper circuit 32, the filter capacitor 33, and the contactor 36 in the second embodiment are added to the circuit system 1 in the first embodiment. Further, in the circuit system 1 in the third embodiment, a connecting wire LH electrically connecting the chopper circuit 32 and an input side of the charging circuit 13 to each other and contactors 34 and 35 are added.

As described above, in a case where a normal mode is switched to a self-running mode, a control unit 60 discharges a filter capacitor 17 charged with power supplied from an overhead wire P and recharges the filter capacitor 17 with power supplied from the power storage unit 40. Further, in the first embodiment and the second embodiment, the charging circuit 13 is used in a case where the filter capacitor 17 is charged with power supplied from the overhead wire P, and the charging circuit 30 is used in a case where the filter capacitor 17 is charged with power supplied from the power storage unit 40.

In the third embodiment, the charging circuit 13 is used in both a case where the filter capacitor 17 is charged with power supplied from the overhead wire P and a case where the filter capacitor 17 is charged with power supplied from the power storage unit 40.

The chopper circuit 32, the filter capacitor 33, and the contactor 36 are the same as those described in the second embodiment, and thus description thereof will be omitted.

The contactor 34 is electrically connected to the filter capacitor 33 in series and sets a cutoff state or a connected state between a positive-side terminal of the chopper circuit 32 and a positive-side terminal of the filter capacitor 33 on the basis of a control signal received from the control unit 60. In a case where the contactor 34 is in a cutoff state, the filter capacitor 33 is not charged with power. In a case where the contactor 34 is in an electrical conduction state, the filter capacitor 33 can be charged with power.

The connecting wire LH electrically connects the chopper circuit 32 and an input side of the charging circuit 13 to each other.

The contactor 35 is provided in the connecting wire LH and sets a cutoff state or a connected state between the chopper circuit 32 and the input side of the charging circuit 13 on the basis of a control signal received from the control unit 60.

The control unit 60 controls the contactors 34, 35, and 36. In a case where a normal mode is switched to a self-running mode, the control unit 60 sets the contactor 35 to be in an electrical conduction state and sets the contactor 36 to be in a cutoff state. Thereby, as indicated by sign GJ, a voltage output from the power storage unit 40 through the chopper circuit 32, the contactor 35, the charging circuit 13, the filter reactor 14, and the discharging circuit 16 is input to the filter capacitor 17. In this manner, the voltage output from the power storage unit 40 is input to the filter capacitor 17, and thus it is possible to charge the filter capacitor 17 with power supplied from the power storage unit 40.

Further, in a case where a normal mode is switched to a self-running mode, the control unit 60 sets the contactor 34 to be in a cutoff state. Thereby, the filter capacitor 33 is prevented from being charged with remaining power.

According to the above-described third embodiment, the control unit 60 controls the charging circuit 13 such that the filter capacitor 17 is charged. Thereby, also in a system in which high voltage power is stepped down by using the converter 50 for a load and stored in the power storage unit 40, the circuit system 1 can effectively use the charging circuit 13 and achieve effective utilization of power used in the railroad vehicle. In addition, the charging circuit 30 is not required to be used, and thus it is possible to achieve space saving.

Further, in a case where the control unit 60 switches a normal mode to a self-running mode, the contactor 34 is opened. Thereby, also in a system in which high voltage power is stepped down by using the converter 50 for a load and stored in the power storage unit 40, the circuit system 1 can prevent the filter capacitor 33 from being charged with remaining power and achieve effective utilization of power used in the railroad vehicle.

Modification Example of Embodiment

Figure 5:
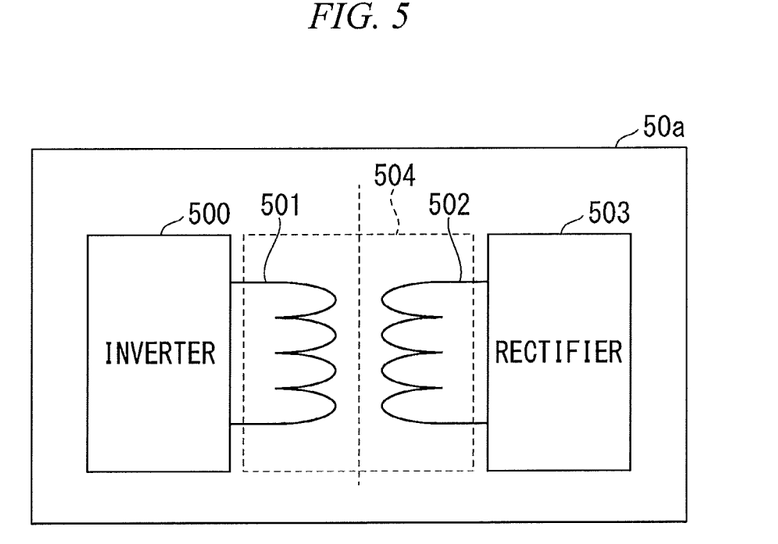
FIG. 5 is a diagram showing a modification example of the embodiment.

A modification example of an embodiment will be described with reference to FIG. 5. FIG. 5 is a diagram illustrating a modification example of the first embodiment. FIG. 5 is a configuration diagram showing a configuration of an insulated type converter 50a used in the converter 50 for a load in the circuit system of FIG. 1.

As shown in FIG. 5, the insulated type converter 50a includes an inverter 500, a coil 501, a coil 502, and a rectifier 503.

The inverter 500 converts DC power supplied from an overhead wire P into AC power. The inverter 500 includes, for example, a switching element and switches the switching element to an electrical connection state or a cutoff state to convert DC power into AC power.

The coil 501 is connected to the inverter 500.

The coil 502 is connected to the rectifier 503. The coil 501 and the coil 502 are electrically insulated from each other. The coil 501 is set to be a primary-side coil and the coil 502 is set to be a secondary-side coil, whereby an insulation transformer 504 is formed.

The rectifier 503 rectifies transformed AC power which is input through the coil 502 on the secondary side and converts the AC power into DC power. Thereby, power which is output from the rectifier 503 is transformed DC power.

According to the above-described modification example, the insulated type converter 50a is used as the converter 50 for a load. Thereby, according to the circuit system 1, the overhead wire P and the inverter 51 for a load can be electrically insulated from each other by the insulated type converter 50a, and thus it is possible to prevent high voltage power supplied from the overhead wire P from being erroneously output to the inverter for a load in a high voltage state.

Meanwhile, a case where DC power is supplied from the overhead wire P has been described in at least one of the above-described embodiments, but the invention is not limited thereto. Power supplied from the overhead wire P may be AC power. In this case, for example, an AC/DC converter is used as the converter 50 for a load.

According to at least one of the above-described embodiments, the circuit system 1 for a railroad vehicle includes the power conversion unit 20, the converter 50 for a load, the inverter 51 for a load, the power storage unit 40, and the control unit 60. Thereby, according to the circuit system 1 for a railroad vehicle, it is possible to achieve effective utilization of power used in the railroad vehicle.

Although some embodiments have been described above, those embodiments are described as examples, and do not intend to limit the scope of the invention. Those novel embodiments may be embodied in other various modes, and may be variously omitted, substituted, and modified without departing from the scope of the invention. Those embodiments and modification thereof are within the scope and the gist of the invention, and are within the scope of the invention described in the scope of claims and the equivalent thereof.

REFERENCE SIGNS LIST

1 Circuit system for railroad vehicle
12 Breaker
13, 30 Charging circuit
20 Power conversion unit
40 Power storage unit
50 Converter for load
51 Inverter for load
60 Control unit
P Overhead wire

The invention claimed is:

1. A circuit system for a railroad vehicle, the circuit system comprising:
　a power conversion unit which converts power supplied from an overhead wire into power for driving a motor for running mounted on a railroad vehicle;
　a first converter which converts power supplied from the overhead wire into DC power;
　a second converter which converts power output from the first converter into power for driving a load mounted on the railroad vehicle;
　a power storage unit which is electrically connected to an input side of the second converter;
　a first charging circuit which is electrically connected between the power storage unit and the power conversion unit;
　a first filter capacitor which is provided on a side of power supply of the power conversion unit;
　a discharging circuit which discharges the filter capacitor; and
　a control unit which inputs regenerative power output from the power conversion unit to the first converter and inputs power output from the first converter to the power storage unit in a case where it is determined that the railroad vehicle is being regenerated in a normal mode, controls the discharging circuit and discharges the first filter capacitor, and controls the first charging circuit and charges the first filter capacitor with power output from the power storage unit in a case where it is determined that the railroad vehicle has been switched from the normal mode to a self-running mode.

2. The circuit system for a railroad vehicle according to claim 1, wherein
　the control unit inputs power output from the power storage unit to the second converter, and
　the second converter converts power output from the power storage unit into power for driving a load mounted on the railroad vehicle.

3. The circuit system for a railroad vehicle according to claim 1, wherein the control unit supplies power output from the power storage unit to the power conversion unit without converting the voltage in a case where it is determined that the railroad vehicle is in the self-running mode.

4. The circuit system for a railroad vehicle according to claim 1, wherein the control unit inputs the regenerative power output from the power conversion unit without intervention of the first converter in a case where it is determined that the railroad vehicle is in the self-running mode and being regenerated.

5. The circuit system for a railroad vehicle according to claim 1, wherein the first converter is an insulated type converter.

* * * * *